US006145805A

United States Patent [19]

Smith, III et al.

[11] Patent Number: 6,145,805

[45] Date of Patent: Nov. 14, 2000

[54] LIQUID CONTROL VALVE ASSEMBLY WITH LOCAL DAMPING AND HYDRAULICALLY ACTUATED FUEL INJECTOR USING SAME

[75] Inventors: Ralph A. Smith, III; Steven Y. Tian, both of Bloomington, Ill.

[73] Assignee: Caterpillar Inc., Peoria, Ill.

[21] Appl. No.: 09/379,086

[22] Filed: Aug. 23, 1999

[51] Int. Cl.[7] .................... F16K 31/00

[52] U.S. Cl. .................... 251/48; 251/51; 251/54

[58] Field of Search .................... 251/48, 50, 51, 251/54, 30.01, 33, 35, 36, 37

[56] References Cited

U.S. PATENT DOCUMENTS

| | | | |
|---|---|---|---|
| 4,462,426 | 7/1984 | Rexer | 251/37 |
| 4,552,172 | 11/1985 | Krieger et al. | 251/24 |
| 4,583,567 | 4/1986 | Arav | 251/50 |
| 5,048,790 | 9/1991 | Wells | 251/36 |
| 5,288,025 | 2/1994 | Cerny | 251/50 |
| 5,839,661 | 11/1998 | Iwanaga | 251/36 |

*Primary Examiner*—Joseph A. Kaufman
*Assistant Examiner*—Eric Keasel
*Attorney, Agent, or Firm*—Eric M. Bram

[57] ABSTRACT

A hydraulically actuated fuel injector comprises a valve body and a stepped valve member. The valve body has a wide bore portion and a narrow bore portion. The stepped valve member has a wide member section and a narrow member section. The wide member section is slidably disposed in the wide bore portion and defines a first diametrical clearance therebetween. The narrow member section and the wide bore portion define a damping chamber therebetween that is wider than the first diametrical clearance. The stepped valve member is slidable between a first position at which the damping chamber is substantially fluidly open to a low pressure hydraulic fluid reservoir, and a second position at which a fractional portion of the narrow member section is slidably disposed within a portion of the narrow bore portion defining a second diametrical clearance therebetween that is less wide than the damping chamber and substantially restricts fluid communication between the damping chamber and the reservoir.

22 Claims, 4 Drawing Sheets

LIQUID CONTROL VALVE ASSEMBLY WITH LOCAL DAMPING AND HYDRAULICALLY ACTUATED FUEL INJECTOR USING SAME

TECHNICAL FIELD

This invention relates generally to damped liquid valve assemblies, and more particularly to noise reduction or valve seat wear reduction in high speed control valve assemblies, such as those used in hydraulically actuated fuel injectors.

BACKGROUND

In one class of control valve assemblies, a valve member is moved between upper and lower valve seats during its actuation cycle. For instance, in many hydraulically actuated fuel injectors, a control valve assembly includes a control valve member that is moved between upper and lower conical valve seats by a solenoid and a biasing spring. Although the control valve member moves a distance on the order of only about several hundred microns, the valve member can have a substantial velocity when it impacts one of the seats.

It is usually undesirable to have the valve member linger for any substantial length of time in between the upper and lower valve seats. Thus, relatively high accelerations and velocities are usually desirable when moving the valve member from one seat to the other. However, it is also typically desirable to have impact velocities that do not cause unnecessary damage to the valve seats nor cause undesirable noise.

In most cases, damage to the valve seats can be reduced by an appropriate design and by the use of suitable materials, but not eliminated entirely. Wear to the valve seats will degrade fuel injector performance overtime, and may eventually lead to failure of the unit.

Moreover, the problem of reducing noise produced by impact of the valve member on one of its seats can often prove problematic. While noise often does not undermine the performance of a valve assembly, a consumer may perceive a problem due to the presence of noise. This noise usually reveals itself as a loud clicking that is not only annoying, but often undermines a users confidence in the valve, because the noise sometimes lends one unfamiliar with a given system the impression that the valve is not working properly.

The invention is directed to addressing one or more of the above concerns.

DISCLOSURE OF THE INVENTION

A hydraulically actuated fuel injector comprises a valve body and a stepped valve member. The valve body has a wide bore portion and a narrow bore portion. The stepped valve member has a wide member section and a narrow member section.

The wide member section is slidably disposed in the wide bore portion and defines a first diametrical clearance therebetween. The narrow member section and the wide bore portion define a damping chamber therebetween that is wider than the first diametrical clearance.

The stepped valve member is slidable between a first position at which the damping chamber is substantially fluidly open to a low pressure hydraulic fluid reservoir, and a second position at which a fractional portion of the narrow member section is slidably disposed within a portion of the narrow bore portion defining a second diametrical clearance therebetween that is less wide than the damping chamber and substantially restricts fluid communication between the damping chamber and the reservoir.

BRIEF DESCRIPTION OF THE DRAWINGS

For a better understanding of the present invention, reference may be made to the accompanying drawing figures, which are illustrative and not necessarily drawn to scale, and in which.

DETAILED DESCRIPTION

Figure 1:
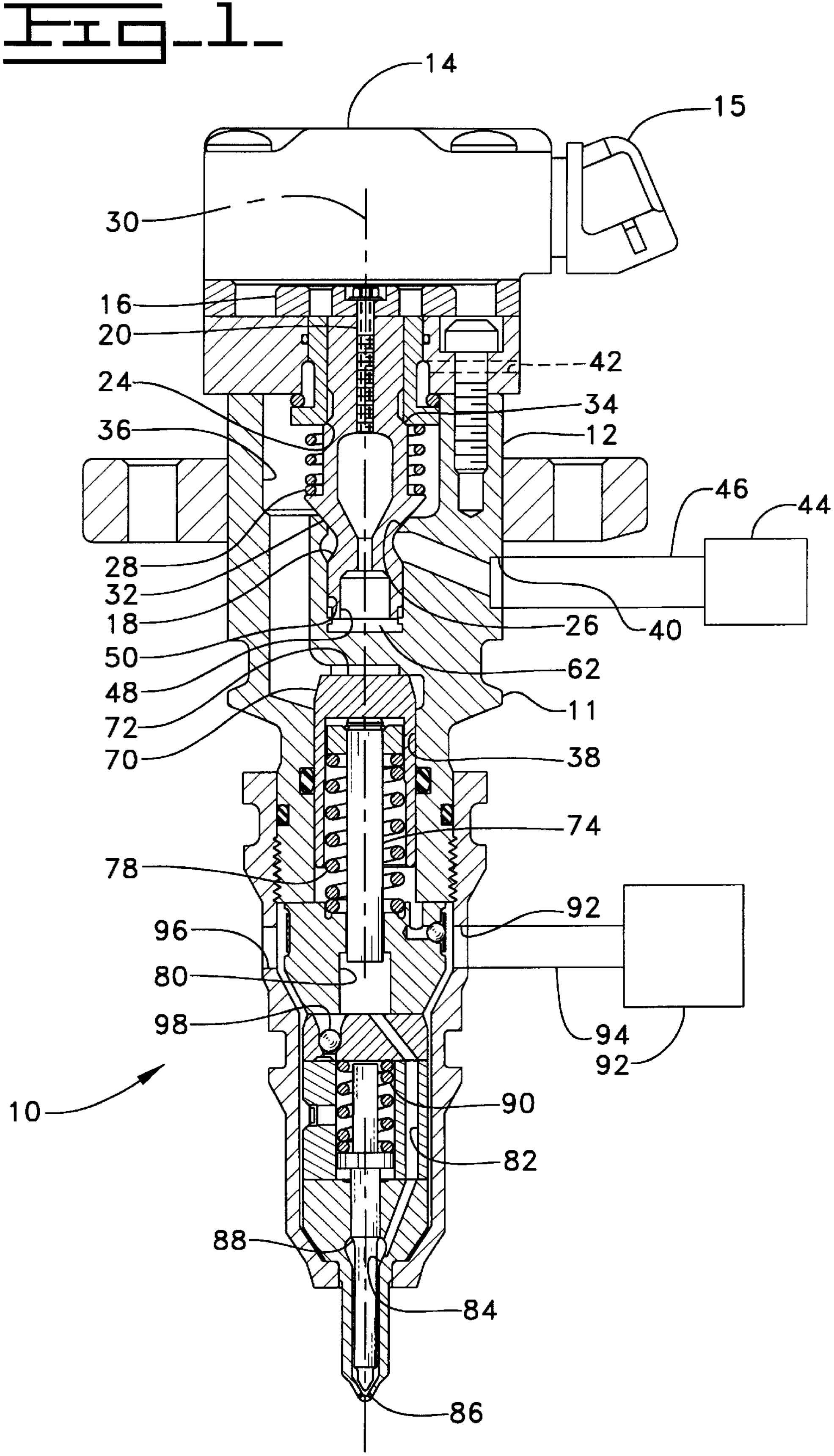
FIG. 1 is a sectioned side diagrammatic view of a first embodiment of a hydraulically actuated fuel injector according to the invention.
Figure 2:
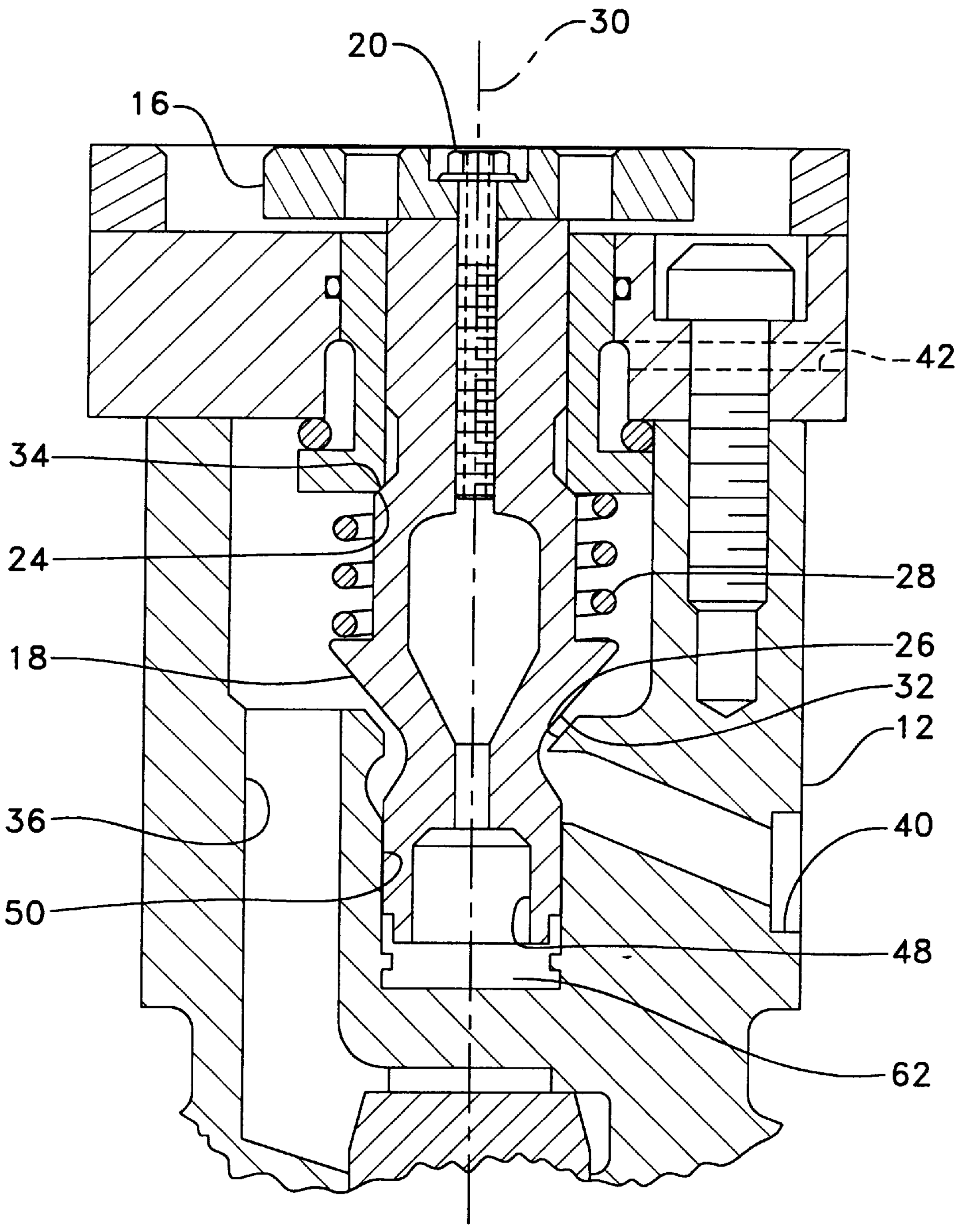
FIG. 2 is an enlarged sectioned side diagrammatic view of a control valve assembly portion of the fuel injector shown in FIG. 1.
Figure 3:
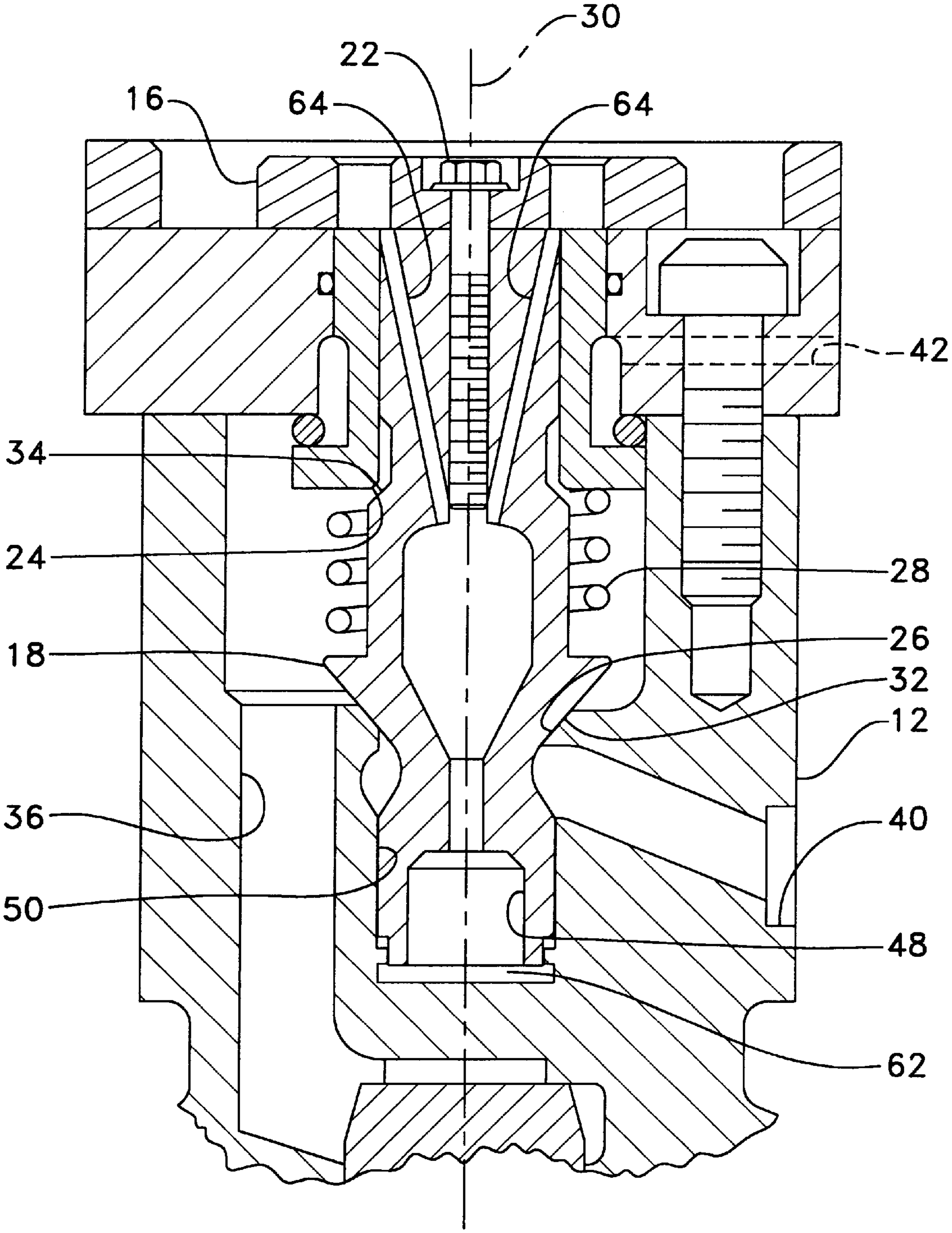
FIG. 3 is an enlarged sectioned side diagrammatic view of a control valve assembly portion of a second embodiment of a fuel injector according to the invention.

FIGS. 1–4 illustrate embodiments of a hydraulically actuated fuel injector 10 including an injector body 11 made up of a plurality of components attached with one another in a manner well known in the art including a valve body 12. A solenoid 14 or other type of electronic actuator 14, a piezoelectric actuator for example, is attached with the valve body 12. The electronic actuator 14 is controlled by an electronic controller, a computer for example, via an electronic control interface 15. The solenoid actuator 14 of the illustrated embodiments includes an armature 16 attached with a stepped valve member 18, for example a poppet valve member 18 as in the illustrated embodiments. In the illustrated embodiments the armature 16 is attached with the stepped valve member 18 by a hollow fastener 20 as in FIG. 2 or a non-hollow fastener 22 as in FIG. 3.

The valve body 12 defines a low pressure seat 24 and a high pressure seat 26. A biasing spring 28 biases the stepped valve member 18 downward relative to the drawing parallel to a centerline 30. The solenoid 14 is an attractive solenoid capable of biasing the stepped valve member 18 upward relative to the drawing parallel to the centerline 30. The stepped valve member has a lower conical valve surface 32 and an upper conical valve surface 34 engageable with the high pressure seat 26 and the low pressure seat 24, respectively.

An actuation fluid cavity 36 in the valve body 12 fluidly connects a piston bore 38 with a central portion of the stepped valve member 18 between the upper and lower conical valve surfaces 32, 34. The valve body 12 also comprises a high pressure actuation fluid inlet 40 and a low pressure actuation fluid drain 42. A high pressure actuation fluid source 44 is fluidly connected with the high pressure actuation fluid inlet 40 via a high pressure supply passage 46. The hydraulic medium used for the high pressure actuation fluid is typically, although not necessarily, engine lubricating oil. Other hydraulic media may also be used, engine fuel for example.

The stepped valve member 18 has a hollow interior 48 and is slidably disposed in a stepped guide bore 50. The stepped guide bore 50 has an upper section that holds an upper section of the stepped valve member 18 and a lower section that holds a lower section of the stepped valve member 18. Between the upper and lower sections of the stepped guide bore 50, where the actuation fluid cavity 36 meets the stepped valve member 18, central portions of the stepped valve member 18 including the upper and lower conical valve surfaces 32, 34 extend beyond the radius of the stepped guide bore 50.

The lower section of the stepped valve member 18 (see FIG. 4) comprises a wide member section 52 and a narrow member section 54 sized to fit within a wide bore portion 56 and a narrow bore portion 58, respectively, of the lower section of the stepped guide bore 50. The wide member section 52 is at all times slidably disposed within the wide bore portion 56, separated by a first diametrical clearance 60.

The stepped valve member 18 is slidable between two seated positions. At a first position the low pressure seat 24 is engaging the upper conical valve surface 34 and the narrow member section 54 is clear of the narrow bore portion 58. At a second position the high pressure seat 26 is engaging the lower conical valve surface 32 and at least a portion of the narrow member section 54 extends within the narrow bore portion 58.

The narrow bore portion 58 beneath the narrow member section 54 partially defines an outer perimeter of a low pressure reservoir 62 that extends through the hollow interior 48 and through the hollow fastener 20 (FIG. 2) or one or more other communication passages 64 if a solid fastener is used (FIG. 3), to a source of low pressure hydraulic fluid (not shown).

When a portion of the narrow member section 54 extends within the narrow bore portion 58 it is separated by a very narrow second diametrical clearance 66. The portion of the narrow member section 54 that is not within the narrow bore portion 58 forms a damping chamber 68 with the wide bore portion 56. Although the damping chamber 68 does not necessarily need to extend all the way around the stepped valve member 18, in the illustrated embodiments it does, so that the damping chamber 68 has an annular shape.

When the narrow member section 54 extends within the narrow bore portion 58 the damping chamber 68 is closed off from the low pressure reservoir 62 except by the first diametrical clearance 60 and the second diametrical clearance 66. However, when the narrow member section 54 does not extend within the narrow bore portion 58, the damping chamber 68 is open to the low pressure reservoir 62 so that hydraulic fluid can flow freely between them.

The fuel injector 10 also includes a reciprocating piston 70 positioned in the piston bore 38 and slidable between a retracted position, as shown in FIG. 1, and a downward advanced position. The piston 70 includes a hydraulic surface 72 fluidly connected with the actuation fluid cavity 36.

The fuel injector 10 also includes a plunger 74 that moves in a plunger bore 76 between a retracted position, as shown, and a downward advanced position. The piston 70 and the plunger 74 are connected to move together, and both are normally biased upward toward their respective retracted positions by a piston return spring 78.

The piston 70 extends downward into a fuel pressurization chamber 80 that is fluidly connected via a nozzle supply passage 82 to a nozzle chamber 84. One or more nozzle outlets 86 connect with the nozzle chamber 84. A needle valve member 88 extends into the nozzle chamber 84 and is biased downward against the nozzle outlets 86 by a needle biasing spring 90 to a position at which the needle valve member 88 closes the nozzle outlets 86 to the nozzle chamber 84.

A fuel fluid source 92 is connected via a fuel supply passage 94 to a fuel inlet 96. The fuel inlet 96 is connected via a ball valve 98 to the nozzle chamber 84. Preferably, although not necessarily, the fuel fluid and hydraulic medium are different liquids, such as diesel fuel and lubricating oil, respectively.

Figure 5:
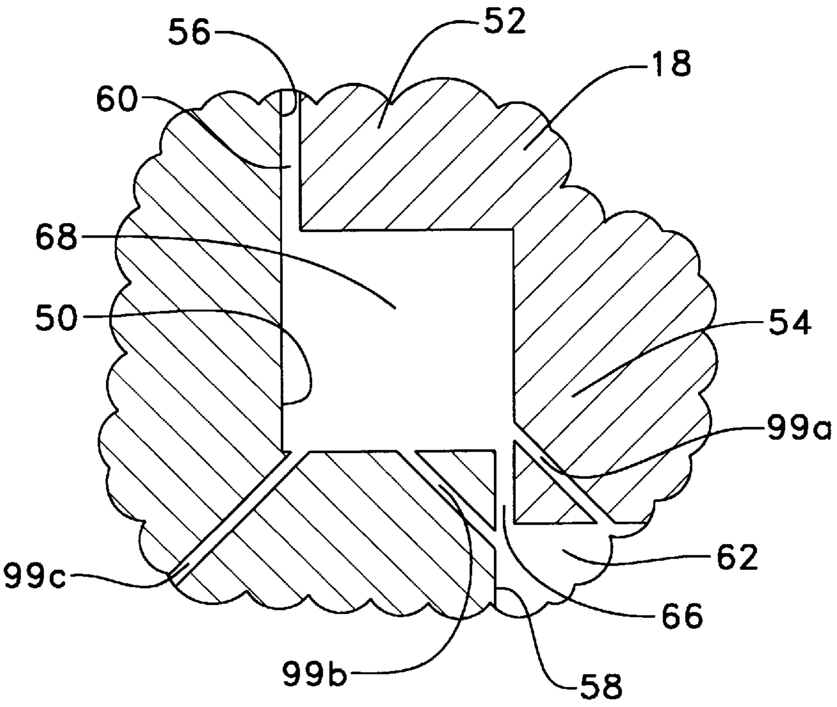
FIG. 5 is an enlarged and exaggerated sectioned side diagrammatic view of alternate damping means for the embodiments of FIGS. 1–3.

FIG. 5 illustrates configurations for other possible embodiments in the vicinity of the damping chamber 68, in which one or more drainage passages 99*a*, 99*b*, 99*c* connect the damping chamber 68 with either the low pressure reservoir 62 or another low pressure reservoir (not shown).

INDUSTRIAL APPLICABILITY

The stepped valve member 18 is normally biased by the biasing spring 28 toward the seated position at which the low pressure seat 24 is open and the high pressure seat 26 is closed. When the solenoid 14 is energized the armature 16 pulls the stepped valve member 18 along the centerline 30 toward the other seated position to open the high pressure seat 26 and close the low pressure seat 24. Thus, the stepped valve member 18 moves the pair of conical valve surfaces 32, 34 to alternatively close one of while opening the other of the high pressure seat 26 and the low pressure seat 24, respectively. The distance that the stepped valve member 18 moves between the first and second seated positions is generally on the order of several hundred microns in a fuel injector of this type.

In order to decrease the inertia of the stepped valve member 18 and hasten its movement between valve seats 26 and 24, the stepped valve member 18 is machined to include the hollow interior 48. The stepped valve member 18 is guided in its up and down movement along the centerline 30 by the stepped guide bore 50 in order to ensure proper sealing at the seats.

Between injection events the solenoid 14 is de-energized, the stepped valve member 18 is seated to close the high pressure seat 26 and open the low pressure seat 24, the piston 70 and the plunger 74 are in their retracted positions as shown, and the needle valve member 88 is in its downward closed position.

Each injection event is initiated by energizing the actuator, which in the illustrated embodiments is the solenoid 14 although other actuators such as a piezo actuators for example may be used. The actuator causes the stepped valve member 18 to move upward to the open high pressure seat 26 and close the low pressure seat 24. Because the stepped valve member 18 must move some finite distance to accomplish this task, the high pressure inlet 40 must necessarily be open to the low pressure drain 42 when the stepped valve member 18 is between seats. In order to perform properly and prevent unnecessary losses, the actuator 14 is preferably sized to quickly move the stepped valve member 18 upward to initiate the injection event.

When the solenoid 14 is energized, the actuation fluid cavity 36 is opened to the high pressure actuation fluid source 44 via the high pressure supply passage 46 and the actuation fluid inlet 40 past the high pressure seat 26. The high pressure hydraulic fluid can then proceed to apply pressure against the hydraulic surface 72 of the reciprocating piston 70, which forces the plunger 74 downward into the fuel pressurization chamber 80.

When the plunger 74 is pushed downward by the piston 70, fuel within the fuel pressurization chamber 80 is raised to relatively high injection pressures. This high pressure fuel is pushed along nozzle supply passage 82, into the nozzle chamber 84, and eventually out of the nozzle outlet 86 during the injection event. The high pressure fuel hydraulically lifts the needle valve member 88 against the action of the needle biasing spring 90 during the injection event to open the nozzle outlet 86.

Between injection events, when fuel pressure is relatively low, the needle return spring 90 biases the needle valve member 88 downward to block the nozzle outlet 86. Between injection events when plunger 74 is retracting, fresh fuel is drawn into fuel pressurization chamber 80 from the fuel source 92, through the fuel supply passage 94, into the fuel inlet 96, and past the ball valve 98.

When the high pressure seat 26 opens, high pressure actuation fluid flows through the actuation cavity 36 and acts on the hydraulic surface 72 to begin the downward stroke of the piston 70 and the plunger 74. This causes the pressure of fuel within the fuel pressurization chamber 80 to quickly rise. When the fuel pressure exceeds the valve opening pressure sufficient to overcome the needle biasing spring 90, the needle valve member 88 moves upward to its open position, and fuel commences to spray out of the nozzle outlet 86.

To end the injection event the solenoid 14 is de-energized. This causes the stepped valve member 18 to move downward to close the high pressure seat 26 under the action of the biasing spring 28. In most cases, the stepped valve member 18 begins its downward movement from the rest position in contact with the low pressure seat 24. However, in some instances, particularly at idle, the solenoid on-time may be so brief that the stepped valve member 18 never comes to rest against the low pressure seat 24. In some more unusual cases, the stepped valve member 18 actually bounces off of the low pressure seat and moves downward toward the high pressure seat 26 at the much higher rate.

In any event, when the stepped valve member 18 contacts the high pressure seat 26 impact noise is produced, and the actuation cavity 36 is cut off from the high pressure actuation fluid source 44. When this occurs, the piston 70 and the plunger 74 cease their downward movement, which results in a sudden drop of fuel pressure. When the fuel pressure drops below the valve closing pressure, the needle return spring 90 pushes the needle valve member 88 downward to again close the nozzle outlet 86 and end the injection event.

Now the damping effect of the invention is discussed with reference to FIGS. 2–5. To reduce wear on the high pressure seat 26 and to decrease the noise produced when the stepped valve member 18 impacts the high pressure seat 26, the invention utilizes an appropriately sized damping chamber 68. The only forces acting on the stepped valve member 18 when it is moving downward are produced by the biasing spring 28 and the opposing hydraulic force on the underside of stepped valve member 18 due to fluid pressure in the low pressure reservoir 62 and in the damping chamber 68. However, any pressure change in the low pressure reservoir 62 will be negligible, and thus it plays no significant part in slowing the stepped valve member 18.

The situation is different with the damping chamber 68. As the stepped valve member 18 moves downward the damping chamber 68 becomes smaller. If drainage from the damping chamber 68 is restricted so that hydraulic fluid can not escape quickly enough from the damping chamber 68 as it shrinks, fluid pressure in the damping chamber 68 will rise significantly. If the pressure in the damping chamber 68 gets sufficiently high, the movement of stepped valve member 18 will be effectively hydraulically braked. Thus, the damping chamber 68 can be used to slow the speed of the stepped valve member 18 as it moves toward the second position and its conical valve surface 32 approaches the high pressure seat 26 of the valve body 12.

At the extremes, if drainage from the damping chamber 68 were eliminated altogether, the stepped valve member 18 would become hydraulically locked and be unable to move downward. On the other hand, when the damping chamber 68 is completely open to the low pressure reservoir 62, the stepped valve member 18 could move at virtually any rate without creating any significant flow restriction. Between these two extremes, the damping chamber 68 and the drainage passages therefrom can be sized so that restricted fluid communication for drainage of the damping chamber 68 can be accomplished.

By restricted fluid communication we mean fluid communication that allows a significant amount of hydraulic fluid to pass from the damping chamber 68 to a low pressure hydraulic fluid reservoir while the damping chamber 68 is becoming smaller because of movement of the stepped valve member 18 during normal operation of the fuel injector, but does not allow the hydraulic fluid to drain quickly enough to prevent a rapid, substantial increase of hydraulic fluid pressure within the damping chamber 68.

In the illustrated embodiments, when the stepped valve member 18 is at the first position (FIG. 2) and starts its motion toward the second position the damping chamber 68 is open to the low pressure reservoir 62 so that the hydraulic fluid in the damping chamber 68 freely moves out of the way of the descending stepped valve member 18. However, when the stepped valve member 18 moves toward the second position (FIG. 3) enough so that the narrow member section 54 slides within the narrow bore portion 58, egress of the hydraulic fluid is severely restricted, which quickly slows the stepped valve member 18.

Figure 4:
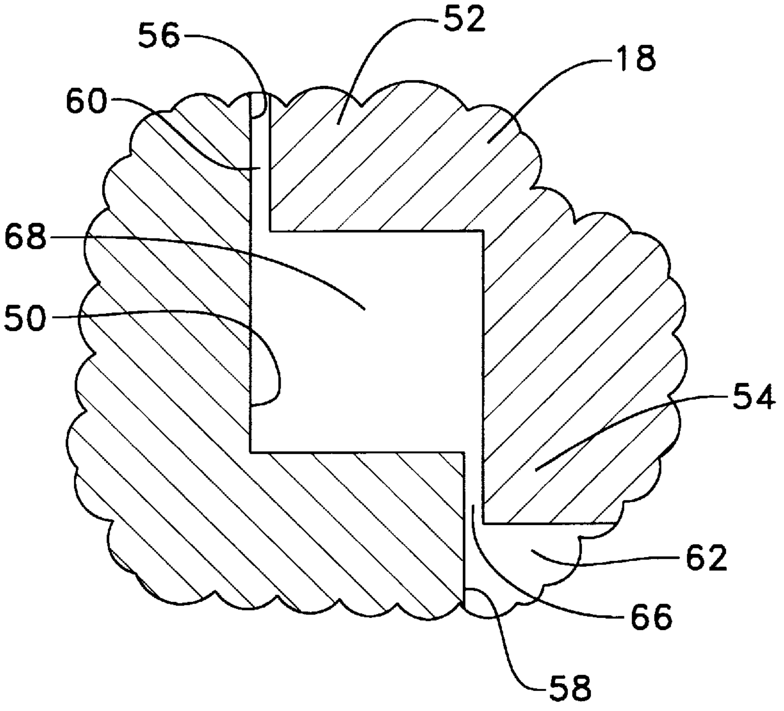
FIG. 4 is an enlarged and exaggerated sectioned side diagrammatic view of damping means used in the embodiments of FIGS. 1–3.

In the embodiment of FIG. 4 the hydraulic fluid can escape from the damping chamber 68 only via the first diametrical clearance 60 and the second diametrical clearance 66. These clearances will generally be in the order of 10 microns in width. The timing and rate of deceleration of the stepped valve member 18 can be adjusted both by varying the width of the clearances, especially the second diametrical clearance 66, which is wider than the first diametrical clearance 60 in the illustrated embodiments, or by varying the length of the narrow member section 54, so that the damping affect continues for a longer time.

FIG. 5 shows how the damping rate can be adjusted further by adding one or more drainage passages **99*a*, 99*b*, 99*c* to allow a constant or variable flow of hydraulic fluid from the damping chamber 68 (in addition to the flow through the first diametrical clearance 60 and the second diametrical clearance 66) once the damping chamber 68 is closed off from the low pressure reservoir 62**, to further adjust or vary the damping force.

For example, it can be seen that in FIG. 5 exit flow of hydraulic fluid from the damping chamber 68 and therefore the damping force, depends initially on the total flow areas (minimum cross sections) of all the drainage passages 60, 66, **99*a*, 99*b*, 99*c*. However, it can be appreciated that as the narrow member section 54 proceeds downward and the second diametrical clearance 66 becomes longer, first the exit from the drainage passage 99*b*, and then the entrance to the drainage passage 99*a*, will lie entirely within the second diametrical clearance 66. When this occurs the drainage passages 99*b*, 99*a* will no longer have an additive effect on total draining flow, since once a drainage passage terminates within the second diametrical clearance 66 the limiting factor for flow rate will be the minimum cross section of the second diametrical clearance 66**.

It will be appreciated that the drainage passages 99*a*, 99*b*, 99*c* are placed arbitrarily in FIG. 5 for illustrative purposes; these passages could be placed in any number of different positions, numbers, and combinations to practice the invention. All that is required is that a small total draining flow be established between the damping chamber 68 and either the low pressure reservoir 62 or some other source or sink of low pressure hydraulic fluid.

In order to improve consistency and results between several produced injectors, the first diametrical clearance 60, the second diametrical clearance 66, and the drainage passages 99*a*, 99*b*, 99*c* (if any), preferably have uniform respective diameters made using known and reliable machining or laser drilling techniques.

The above description is intended for illustrative purposes only and is not intended to limit the scope if the invention in any way. Various modifications and changes could be made to the disclosed embodiment without departing from the spirit and intended scope of the invention, which is defined by the claims set forth below.

We claim:

1. A damped liquid valve assembly, comprising:

a valve body having a stepped guide bore comprising a wide bore portion and a narrow bore portion; and a stepped valve member having a wide member section and a narrow member section, the wide member section being slidably disposed in the wide bore portion and defining a first diametrical clearance therebetween, the narrow member section and the wide bore portion defining a damping chamber therebetween that is wider than the first diametrical clearance, the stepped valve member being slidable between a first position at which the damping chamber is substantially fluidly open to a low pressure hydraulic fluid reservoir, and a second position at which a fractional portion of the narrow member section is slidably disposed within a portion of the narrow bore portion defining a second diametrical clearance therebetween that is less wide than the damping chamber and substantially restricts fluid communication between the damping chamber and the reservoir.

2. The damped liquid valve assembly of claim 1, wherein the valve body further comprises a seat and the stepped valve member is a poppet valve member and engages the seat when the stepped valve member is at the second position.

3. The damped liquid valve assembly of claim 2, further comprising an electronic actuator capable of moving the stepped valve member from one of the first position and the second position to the other of the first position and the second position.

4. The damped liquid valve assembly of claim 3, further comprising an electronic control interface that can communicate with an electronic controller capable of controlling the actuator.

5. The damped liquid valve assembly of claim 4, further comprising a reciprocating piston responsive to movement of the stepped valve member.

6. The damped liquid valve assembly of claim 3, wherein the electronic actuator is a solenoid type actuator.

7. The damped liquid valve assembly of claim 1, further comprising a spring biasing the stepped valve member toward the second position.

8. The damped liquid valve assembly of claim 1, wherein the valve body further comprises at least one drainage passage therethrough that provides restricted fluid communication from the damping chamber.

9. The damped liquid valve assembly of claim 1, wherein the stepped valve member further comprises at least one drainage passage therethrough that provides restricted fluid communication from the damping chamber.

10. The damped liquid valve assembly of claim 1, wherein one of the valve body and the stepped valve member further comprises at least one drainage passage therethrough that provides some fluid communication between the damping chamber and the second diametrical clearance when the stepped valve member is at the second position.

11. A damped liquid valve assembly, comprising:

a valve body having a bore;

a valve member slidably disposed in the bore between a first position and a second position; and damping means comprised by the bore and the valve member for damping motion of the valve member toward the second position by forming a damping volume between the bore and the valve member, the damping volume becoming smaller as the valve member approaches the second position and having a restricted fluid access therefrom.

12. The damped liquid valve assembly of claim 11, wherein the valve body comprises a seat and the valve member is a poppet valve member and engages the seat when the valve member is at the second position.

13. The damped liquid valve assembly of claim 12, further comprising an electronic actuator capable of moving the valve member from one of the first position and the second position to the other of the first position and the second position.

14. The damped liquid valve assembly of claim 13, further comprising an electronic control interface that can communicate with an electronic controller capable of controlling the actuator.

15. The damped liquid valve assembly of claim 14, further comprising a reciprocating piston responsive to movement of the valve member.

16. The damped liquid valve assembly of claim 11, further comprising a spring biasing the stepped valve member toward the second position.

17. The damped liquid valve assembly of claim 11, wherein the valve body further comprises at least one drainage passage therethrough that provides restricted fluid communication from the damping chamber.

18. The damped liquid valve assembly of claim 11, wherein the stepped valve member further comprises at least one drainage passage therethrough that provides restricted fluid communication from the damping chamber.

19. The damped liquid valve assembly of claim 11, wherein one of the valve body and the stepped valve member further comprises at least one drainage passage therethrough that provides some fluid communication between the damping chamber and the second diametrical clearance when the stepped valve member is at the second position.

20. The damped liquid valve assembly of claim 19, wherein said at least one drainage passage extends between the damping chamber and a low pressure hydraulic fluid reservoir when the stepped valve member is at an intermediate damping position, between the first position and the second position, at which the damping volume has formed.

21. A hydraulically actuated fuel injector, comprising:

a valve body defining a seat and a stepped guide bore, the stepped guide bore including a wide bore portion and a narrow bore portion;

an actuator assembly positioned in the valve body and movable between a first position and a second position with respect to the valve body; and a stepped valve member attached with the actuator assembly, the stepped valve member including a poppet seating surface for engaging the seat, a wide member section, and a narrow member section, the wide member section being slidably disposed in the wide bore portion and defining a first diametrical clearance therebetween, the narrow member section and the wide bore portion defining a damping chamber therebetween that is wider than the first diametrical clearance, the stepped valve member being slidable between an undamped position at which the damping chamber is substantially fluidly open to a low pressure hydraulic fluid reservoir, and first and second damped positions at which a fractional portion of the narrow member section is slidably disposed within a portion of the narrow bore portion defining a second diametrical clearance therebetween that is less wide than the damping chamber and substantially restricts fluid communication between the damping chamber and the reservoir.

22. The hydraulically actuated fuel injector of claim 21, wherein the drainage passage extends between the damping chamber and the reservoir when the stepped valve member is at the first damped position, and the drainage passage terminates within the second diametrical clearance when the stepped valve member is at the second damped position.

* * * * *